March 7, 1950     S. C. MARSH     2,499,404
LIQUEFIED GAS STORAGE AND SUPPLY

Filed June 8, 1946     2 Sheets-Sheet 1

INVENTOR.
SIDNEY C. MARSH
BY
J. William Carson
ATTORNEY

March 7, 1950 S. C. MARSH 2,499,404
LIQUEFIED GAS STORAGE AND SUPPLY
Filed June 8, 1946 2 Sheets-Sheet 2

INVENTOR.
SIDNEY C. MARSH
BY
J. William Carson
ATTORNEY

Patented Mar. 7, 1950

2,499,404

UNITED STATES PATENT OFFICE 2,499,404

LIQUEFIED GAS STORAGE AND SUPPLY

Sidney Clarke Marsh, Hohokus, N. J., assignor to Specialties Development Corporation, Bloomfield, N. J., a corporation of New Jersey Application June 8, 1946, Serial No. 675,377

12 Claims. (Cl. 62—1)

This invention relates to the storage of liquefied gas at lower than atmospheric temperature and its supply as a vapor at predetermined pressure, and particularly to a method and apparatus for liquefying gas in solid phase, storing the liquified gas and subsequently vaporizing the liquefied gas for supply to other apparatus, such as carbonators utilizing carbon dioxide for beverage purposes.

In the storage of liquefied gas in large quantities in a container, it is desirable to refrigerate the stored gas to maintain it at a low temperature and a correspondingly low vapor pressure whereby the wall thickness of the container may be reduced with consequent advantages such as saving in weight, material and cost.

In accordance with this invention, it is proposed to charge a relatively large storage container with gas in solid phase and to liquefy the charge for storage in the container at a low temperature and its correspondingly low vapor pressure. It is necessary to supply heat to the storage container in order to liquefy the gas and bring it to the proper vapor pressure for use and subsequently to refrigerate the container from time to time in order to maintain the contents at a relatively low sub-atmospheric temperature because of the leakage of heat therein.

This invention contemplates the use of a reverse cycle refrigerating system for accomplishing the above wherein, during one cycle of operation, hot refrigerant is placed in thermal contact with the contents of the container to melt the solidified gas and, during the reverse cycle of operation, cold refrigerant serves to maintain the liquefied gas within the container at a predetermined low temperature.

It is customary to insulate the main storage container against the entrance of heat in order to aid in maintaining the contents at uniform sub-atmospheric temperature after such desired temperature has been established. However, if gas in vapor phase is withdrawn from the container, the vaporization taking place in the liquefied gas within the container will have a marked refrigerating action so as to materially reduce the temperature within the container thus requiring the addition of heat thereto in order to maintain a constant vapor pressure. Inasmuch as the container is well insulated such heat would have to be supplied by some heating means within the container such as a coil, as direct transfer of heat from the surrounding atmosphere is held to a minimum by the insulation. Hence, it is proposed to withdraw liquid rather than vapor from the storage container inasmuch as a relatively slow withdrawal of liquefied gas, such as required for carbonators and the like, will not materially effect the temperature within the storage container.

The liquid so withdraw is transferred to a second and smaller container where it is heated by the same reverse cycle refrigerating equipment that is used to maintain the storage container at a constant temperature and pressure. Thus the heat required to vaporize and heat the liquid gas and supply it for use is extracted from the contents of the storage vessel directly or from the atmosphere, whereby the stored liquefied gas is held at a uniform low temperature.

An object of the invention is to provide method and apparatus for liquefying and/or storing the liquefied gas and subsequently supplying this gas in vapor form in a more effective way than heretofore practiced.

Another object is to supply gas in vapor form to equipment, such as carbonators at an automatically maintained correct predetermined and constant temperature and pressure.

Another object is to provide method and means for transferring heat from a storage container or the atmosphere to a separate vaporizer in order to supply vaporized gas at a predetermined temperature without affecting the temperature of the storage container.

Another object is to provide means whereby the vaporized gas may be withdrawn at a higher pressure than that maintained within the gas storage tank.

Another object is to utilize a single source of heat for rapidly and continuously vaporizing liquid gas for supply to further equipment.

A further object is to provide a system or apparatus of the above indicated character which is simple and durable in construction, economical to manufacture and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein.

Heat exchange

Figure 1:
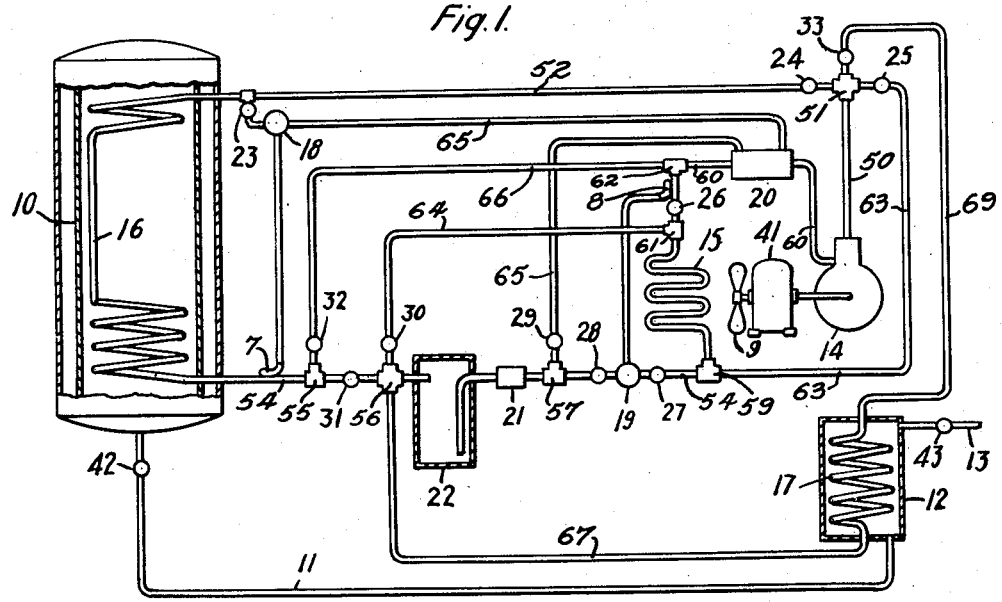
Figure 1 is a diagrammatic view illustrating a system or apparatus in accordance with the invention for practicing the method thereof.

Referring to Figure 1, there is shown a storage tank 10 of conventional construction which is preferably formed of sheet steel and is insulated to retard the inflow of heat. A removable cover of conventional design, not shown is provided for charging tank 10 with solidified gas such as carbon dioxide ice, or the tank 10 may be charged with liquefied gas if desired. A conduit 11 leads from the lower portion of the tank 10 to a second and smaller container 12 which functions as a vaporizer as hereinafter described. Also, a conduit 13 leads from the upper portion of container 12 to further equipment, not shown, and not a part of this invention, utilizing the vaporized gas herein produced, such as a carbonator used in the beverage industry.

A manually operated stop valve 42 is placed in conduit 11 to control the flow of liquified gas to vaporizer 12. A similar manually controlled valve 43 is placed in conduit 13 to control flow of vaporized gas from vaporizer 12.

A heat exchange system is provided comprising a compressor 14 driven by an electric motor 41 or other power means, a heat exchanger 15 which is exposed to the atmosphere or other convenient fluid heat exchange medium, a heat exchanger 16 located within the tank 10 and a heat exchanger 17 located within the vaporizer 12. These heat exchangers consist of conduits which are connected into the system by connecting pipes as will be explained hereinafter in connection with the operation of the apparatus.

Within these connecting pipes expansion valves 18 and 19 are provided in order to produce a differential in pressure, thus causing the refrigerant medium within the system to expand within the heat exchangers 16 and 15 respectively, when desired. The valves 18 and 19 are preferably conventional thermo-expansion valves and are combined with pressure responsive means 7 and 8, respectively, having pressure sensing elements located on the opposite side of their respective heat exchangers 16 and 15 for controlling the admission of refrigerant thereto in response to the temperature of the refrigerant leaving the same. In this manner, liquid refrigerant is also prevented from issuing from the exchangers 15 and 16 and being furnished to the compressor 14.

A small heat exchanger 20 is supplied adjacent the intake side of compressor 14 to conduct heat from the liquid refrigerant expanded by the valve 18 to the vapor refrigerant entering the compressor, whereby any liquid refrigerant which may have issued from the heat exchangers 15 and 16 before closing of the expansion valves is vaporized before reaching the compressor.

A conventional dehydrator 21 and reservoir and trap 22 is provided in the system. Necessary control valves 23 to 33, inclusive, are provided together with connecting piping shown in Figure 1 to permit operation of the heat exchangers 15 and 16 as either condensers or evaporators and the heat exchanger 17 as a condenser in a compressor condenser expander refrigeration system. These control valves are preferably electrically actuated and in the closed position except when energized by the electrical circuit hereinafter described.

In connection with the heat exchanger 15, a fan 9 is preferably provided to increase its efficiency. The fan preferably is driven by the conventional electric motor 41, also used to drive the compressor 14 but may be driven by other suitable power means.

The system is charged with a suitable standard refrigerant medium.

Control system

An electrical control system is provided to automatically control the heating and cooling of the several heat exchangers described by actuating the proper valves. The operation of the valves is responsive to change of pressure within the tank 10 and the vaporizer 12 as hereinafter described.

Figure 2:
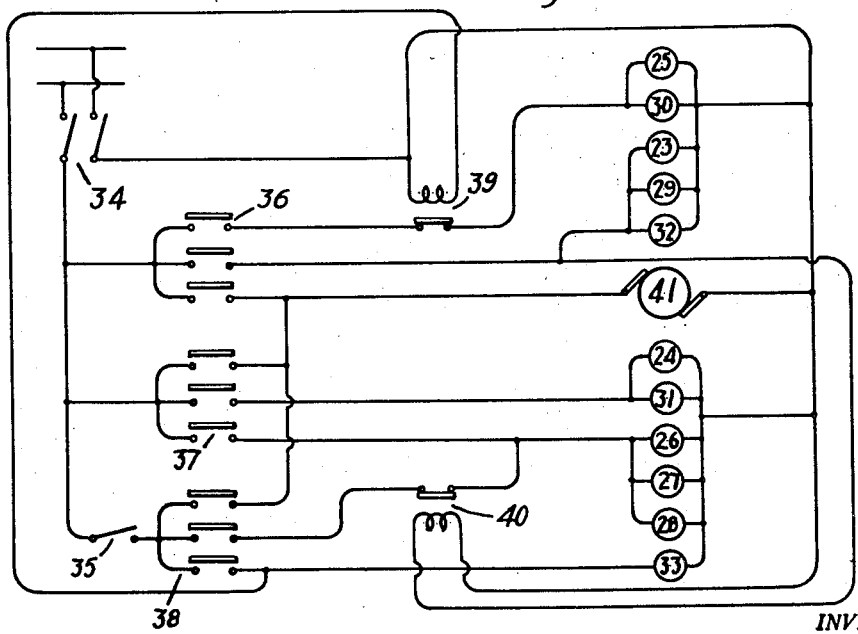
Figure 2 is a wiring diagram for the automatic controls of the system shown in Figure 1.

A wiring diagram for the control is indicated in Figure 2 of the drawing in which the numbers within the circles correspond to the numbers of the control valves and the motor 41 of Figure 1.

The power and control circuit is energized by a double pole single throw switch or other appropriate manually controlled switch 34. In addition to and in series with the manual control switch just described, a triple pole single throw type control switch 36, actuated by a device 1 responsive to pressure within the tank 10 over a predetermined amount, controls the appropriate valves for refrigerating tank 10. Similarly, a triple pole switch 37 actuated by a device 2 responsive to pressure within the tank controls appropriate valves causing the heating of contents of tank 10. Likewise, a triple pole switch 38 actuated by a device 3 responsive to pressure below a predetermined amount in vaporizer 12, controls appropriate valves for supplying heat to the vaporizer. In addition, a manually controlled single throw single pole switch 35 is provided in series with switch 38 to control the energization of the vaporizer circuit and to prevent heating of the vaporizer except when desired.

Figure 3:
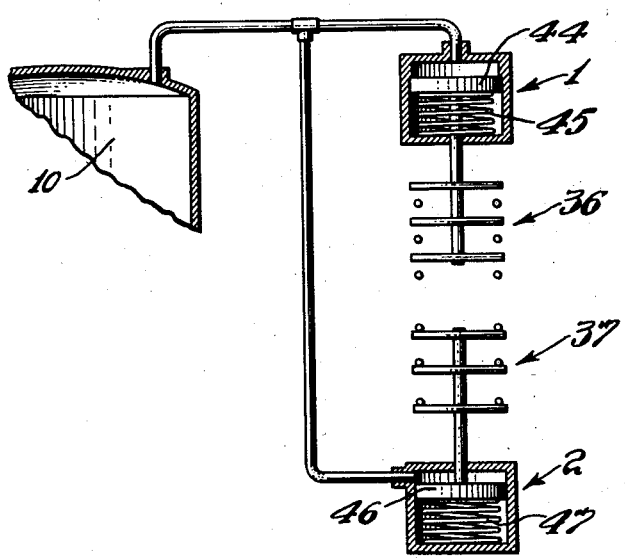
Figure 3 is a schematic view illustrating switch operating means responsive to the pressure in the storage container.

In Figure 3, the devices 1 and 2 and their connection to the tank 10 are illustrated. The device 1 comprises a piston 44 for operating the elements of the switch 36, and a spring 45 for normally positioning the piston to maintain the switch open. The device 2 comprises a piston 46 for operating the elements of the switch 37, and a spring 47 for normally positioning the piston to maintain the switch closed.

Figure 4:
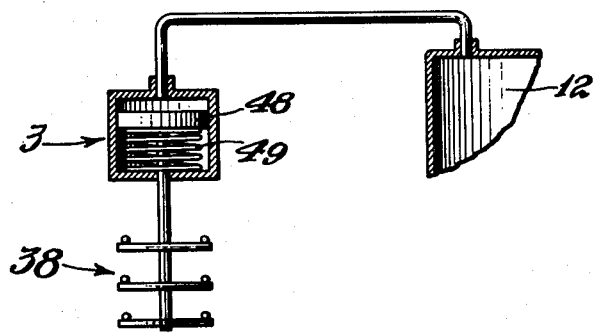
Figure 4 is a schematic view illustrating switch operating means responsive to the pressure in the vaporizer.

In Figure 4, the device 3 and its connection to the tank 12 are illustrated. The device 3 comprises a piston 48 for operating the elements of the switch 38, and a spring 49 for normally positioning the piston to maintain the switch closed.

Inasmuch as the pressure of a gas partly in liquid and partly in vapor phase increases with its temperature, it is obvious that pressure responsive switches 36 and 37 may be replaced by switches responsive to temperature of the gas within tank 10 without departing from the scope of this invention.

Upon actuation of any of the pressure controls hereinabove mentioned, the appropriate valves are opened to effect the heat transfer desired. Simultaneously, the motor 41, driving the compressor and fan used in connection with heat exchanger 15, is energized. In addition, the magnetic coils of switches 39 and 40 are connected to a pole of pressure responsive switches 38 and 36, respectively. These magnetic switches are normally in closed position but are opened when energized. The effect of the inclusion of these switches is to maintain the valves 25, 26, 27, 28 and 30 in closed position when pressure responsive switches 36 and 38 are simultaneously in closed position so as to simultaneously heat the vaporizer 12 and cool the contents of the tank 10 as will be described hereinafter.

The power for the control system, as well as the power for driving the compressor and fan motor, is preferably 115 volt, 60 cycle alternating current, but may be any other convenient power. It is within the scope of the invention to utilize motor or pneumatic control valves instead of solenoid operated valves for control of the system, in which latter case the pneumatic lines would be connected similarly to the electrical circuit described.

Operation

In the operation of the apparatus, the tank 10 is charged with a solidified gas, such as carbon dioxide ice, through a conventional cover, not shown. After charging tank 10, the valve 42 should be in the closed position. The operation includes a heating and cooling cycle in the tank 10, and a vaporizing cycle in the vaporizer 12 as about to be described.

Heating cycle

With the manually controlled switch 34 closed, the pressure actuated switch 37 will be in the closed position (Figure 3) due to the low temperature and correspondingly low vapor pressure within the tank 10. The energizing of the control valves 24, 26, 27, 28 and 31 to open the same, together with the motor 41, will cause the hot refrigerant from the compressor 14 to pass directly to the heat exchanger 16 within the tank 10 by way of a pipe 50, a cross 51 and a pipe 52 in which the valve 24 is connected; and subsequently through the expansion valve 19 into the heat exchanger 15 by way of a pipe 54 having connected therein a T 55, the valve 31, a cross 56, the trap 22, the dehydrator 21, a T 57, the valves 28, 19 and 27, and a T 59. The expanded gaseous refrigerant will accumulate heat from the atmosphere or other convenient external fluid medium in passing through the exchanger 15, and is then passed to the compressor 14 for recycling by way of a pipe 60 having connected therein a T 61, the valve 26, a T 62, and the heat exchanger 20. In this instance, the heat exchanger 16 operates as a condenser and the heat exchanger 15 as an evaporator in a compressor condenser expander heat exchange system.

Upon continued heating of the tank 10, the contents therein will be converted to liquid state and the vapor pressure will increase. When the pressure has increased to a predetermined value, the piston 44 will overcome the spring 45 and the pressure actuated switch 37 will be caused to open and retained in open position, thereby de-energizing the valves 24, 26, 27, 28 and 31 and causing the same to resume their closed position, and de-energizing the motor 41 operating the compressor 14 and causing the same to stop.

Cooling cycle

Upon continued leakage of heat into the tank 10, the temperature of the contents will gradually increase, resulting in a correspondingly increased vapor pressure therein. Upon the attainment of a predetermined pressure in the tank 10 higher than that causing the opening of the switch 37, the piston 46 will overcome the spring 47 and the pressure responsive switch 36 is caused to close, thus energizing the control valves 23, 25, 29, 30, 32 and the compressor motor 41.

The above mentioned control valves permit the hot compressed refrigerant from the compressor 14 to pass to the heat exchanger 15, where the refrigerant is cooled and condensed, by way of the pipe 50, the cross 51, a pipe 63 in which the valve 25 is connected and the T 59. The condensed refrigerant is conducted to the expansion valve 18 by way of the T 61, a pipe 64 in which the valve 30 is connected, the cross 56, the trap 22, the dehydrator 21, the T 57, and a pipe 65 in which the valve 29 and the heat exchanger 20 are connected. The refrigerant passing through the expansion valve 18 enters the heat exchanger 16 by way of the valve 23. The cooled liquid refrigerant expands in the exchanger 16, thus effecting refrigeration of the contents of the tank 10, and is returned to the compressor 14 by way of the pipe 54, the T 55, a pipe 66 having the valve 32 connected therein, the T 62 and the pipe 60. This cycle is continued until such time as the contents of the tank 10 have been cooled to the point at which the vapor pressure therein drops below that required to maintain the pressure responsive switch 36 in closed position, at which time the circuit is opened, the control valves 23, 25, 29, 30 and 32 resume their closed position, and the compressor motor 41 is no longer energized.

In this cycle the heat exchanger 15 operates as a condenser and the heat exchanger 16 in the tank 10 operates as an evaporator in a compressor condenser expander heat exchange circuit.

Vaporizing cycle

At any time after the contents of the tank 10 have been liquefied, with the switches 36 and 37 in open position and the switches 39 and 40 in normally closed position, the manual control valve 42 may be opened to allow the passage of liquefied gas to the vaporizer 12 by way of the conduit 11. After the admission of liquefied gas to vaporizer 12 and with the switch 38 in normally closed position, the manually operated switch 35 may be closed, thus energizing the valves 26, 27, 28 and 33 as well as the compressor motor 41, whereby a portion of the hot refrigerant is conducted from the compressor 14 to the heat exchanger 17 within the vaporizer 12 by way of the pipe 50, the cross 51, and a pipe 69 in which the valve 33 is connected. The refrigerant is condensed in the exchanger 17 and is conducted to the expansion valve 19 and into the heat exchanger 15 by way of a pipe 67, the cross 56 and the pipe 54. While passing through the exchanger 15, the expanded cooled refrigerant accumulates heat from the atmosphere or other external medium and is, in turn, returned to the compressor for recycling by way of the pipe 60.

Upon the attainment of the predetermined pressure within the vaporizer 12, the piston 48 overcomes the spring 49 and the pressure responsive switch 38 is caused to open, thus de-energizing the valves 26, 27, 28 and 33 which return to the closed position, as well as stopping operation of the compressor motor 41. In this cycle the heat exchanger 17 acts as a condenser and the heat exchanger 15 acts as an evaporator in a compressor condenser expander heat exchange circuit.

In the event the pressure in the tank 10 becomes of a value to cause the device 1 to effect closing of the switch 36 while the switch 38 is closed, the coils of switches 39 and 40 are energized to effect opening of switches 39 and 40, thus causing valves 25, 26, 27, 28 and 30 to be closed (together with valves 24 and 31) and causing valves 23, 29, 32 and 33 to be open. Hot refrigerant is then conducted from the compressor 14 to the heat exchanger 17 by way of the pipe 50, cross 51, valve 33 and pipe 69. The refrigerant is cooled and condensed in the heat exchanger 17 and is conducted to the expansion valve 18 by way of the pipe 67, the cross 56, the trap 22, the dehydrator 21, the T 57, the valve 29 and the pipe 65. The cold refrigerant cools the contents of the tank 10 and is heated in passing through the heat exchanger 16, and is returned directly to the intake of the compressor 14 by way of the pipe 54, the T 55, the valve 32, the pipe 66, the T 62, and the pipe 60. When the apparatus operates in this manner, the heat removed from the tank 10 serves to vaporize the contents of the tank 12.

The pressure of vaporized gas within the vaporizer 12 may be maintained higher than the pressure within the tank 10 in order that the tank 10 may be of a lighter construction sufficient to withstand the lower pressure while the relatively smaller vaporizer 12 is of sufficient strength to withstand the pressure at which it is desired to furnish the vaporized gas. For instance, if carbon dioxide is stored and supplied to carbonators, the tank 10 may be maintained at approximately 200 p. s. i. while the vaporizer is operated at 300 p. s. i. If the vaporizer is emptied and pressure released between successive charges no pump will be required to move the liquefied gas therein as the pressure within the tank 10 will be more than sufficient to charge the vaporizer 12, after which valve 42 may be closed before heating the vaporizer 12 in order to prevent backflow.

It is obvious that instead of charging the tank 10 with gas in solid state charging may be performed with liquefied gas in which case little or no heat will be required in order to bring the tank 10 to the desired temperature and pressure and the heating cycle of tank 10 may be substantially or entirely eliminated.

From the foregoing description it will be seen that the present invention provides a simple, workable system for the supply of vapor phase gas at a predetermined pressure for further use from a large body of liquefied gas. Inasmuch as only liquefied gas is withdrawn from the main storage tank 10 the temperature of the contents therein is not materially affected thereby. Further, inasmuch as the conduits 11 and 13 and the vaporizer 12 are preferably not insulated, production of heat from the surrounding atmosphere will aid in the vaporization of the liquefied gas within the vaporizer without affecting in any way the temperature or pressure of the contents of the tank 10. By providing the necessary controls and connections there is provided an automatic means by using the same equipment of selectively either heating or refrigerating the contents of the tank 10 and heating the contents of the vaporizer 12.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a system for converting and conditioning a solidified gas, the combination of a storage tank adapted to receive solidified gas, heat exchange means within said tank, a second tank, a transfer conduit between said tanks, a second heat exchange means within said second tank, and means for heating or cooling said first heat exchange means and for heating said second heat exchange means.

2. In a system for converting and conditioning a solidified gas, the combination of a storage tank adapted to receive solidified gas, heat exchange means within said tank, a second tank, a transfer conduit between said tanks, a second heat exchange means within said second tank, an external heat exchange means, and means for heating said first and second heat exchange means by the addition of heat to said external heat exchange means and cooling said first heat exchange means by the extraction of heat from said external heat exchange means.

3. In a system for converting and conditioning a solidified gas, the combination of a storage tank adapted to receive solidified gas, heat exchange means within said tank, a second tank, a transfer conduit between said tanks, a second heat exchange means within said second tank, and an external heat exchange means including means in thermal contact with the atmosphere for extracting heat from the atmosphere and adding it to either of said other heat exchange means and for extracting heat from said first mentioned heat exchange means and adding it to the atmosphere.

4. In a system for conditioning low temperature liquefied gas for supply in vapor state, an insulated tank for storage of liquefied gas at subatmospheric temperature; a second tank; means for withdrawing liquefied gas from said first tank and transferring the same to said second tank; heat exchange means within each of said tanks; and a refrigerating system for removing heat from the heat exchange means within said insulated tank and adding heat to the heat exchange means within said second tank.

5. In a system for conditioning low temperature liquefied gas for supply in vapor state, an insulated chamber for storage of liquefied gas at subatmospheric temperature; a second chamber; means for withdrawing liquefied gas from said first chamber and transferring the same to said second chamber; heat exchange means within each of said chambers; and heat transfer means, including a motor driven compressor and heat exchange means connected to each of said chamber heat exchange means operable to cool one of said heat exchange means or heat the other of said means.

6. In a system for conditioning low temperature liquefied gas for supply in vapor state, an insulated chamber for storage of liquefied gas at subatmospheric temperature, a second chamber, means for withdrawing liquefied gas from said first chamber and transferring the same to said second chamber, a compressor condenser expander refrigeration system for cooling said first chamber and heating said second chamber, and means responsive to the fluid pressure within said chambers for controlling said refrigeration system.

7. In a system for conditioning low temperature liquefied gas for supply in vapor state, an insulated chamber for storage of liquefied gas at subatmospheric temperature, a second chamber, means for withdrawing liquefied gas from said first chamber and transferring the same to said second chamber, a compressor condenser expander refrigeration system for cooling said first chamber and heating said second chamber, and means responsive to the fluid pressure within said chambers for controlling energization of said refrigeration system and the flow of a refrigerant within.

8. A method of handling normally gaseous materials comprising maintaining a supply of liquefied normally gaseous material in bulk storage, circulating a refrigerant in heat exchange relation with material in bulk storage to withdraw the heat leaking into the stored material from its surroundings and thereby maintain the temperature of the material substantially constant, withdrawing a portion of the material, and transferring heat from the refrigerant to the withdrawn material to effect vaporization of the withdrawn material.

9. A method of handling normally gaseous materials comprising maintaining a supply of liquefied normally gaseous material in bulk storage, circulating a refrigerant in heat exchange relation with the material in bulk storage to withdraw the heat leaking into the stored material from its surroundings and thereby maintain the temperature of the material substantially constant, withdrawing a portion of the material, and transferring heat from the refrigerant to the withdrawn material to effect vaporization of the withdrawn material while simultaneously withdrawing heat from the material stored in bulk.

10. In a system for conditioning low temperature liquefied gas for supply in vapor state, an insulated chamber for storage of liquefied gas at subatmospheric temperature, a second chamber, means for withdrawing liquefied gas from said first chamber and transferring the same to said second chamber, a compressor condenser expander refrigeration system for cooling said first chamber and heating said second chamber, and means responsive to the pressure-temperature condition of the fluid within said chambers for controlling said refrigeration system.

11. In a system for conditioning low temperature liquefied gas for supply in vapor state, an insulated chamber for storage of liquefied gas at subatmospheric temperature, a second chamber, means for withdrawing liquefied gas from said first chamber and transferring the same to said second chamber, a compressor condenser expander refrigeration system for cooling said first chamber and heating said second chamber, and means responsive to the pressure-temperature condition of the fluid within said chambers for controlling energization of said refrigeration system and the flow of a refrigerant within.

12. In a system for conditioning low temperature liquefied gas for supply in vapor state, an insulated tank for storage of liquefied gas at subatmospheric temperature; a second tank; means for withdrawing liquefied gas from said first tank and transferring the same to said second tank; heat exchange means within each of said tanks; a refrigerating system including a compressor and refrigerant circulating conduits for removing heat from the heat exchange means in said first tank and adding heat to the heat exchange means within said second tank; and a heat exchanger for transferring heat from the refrigerant circulated through the heat exchanger of said second tank and transferring the heat to refrigerant circulated through the heat exchanger of said first tank.

SIDNEY CLARKE MARSH.

REFERENCES CITED

The following references are of record in the file of this patent:

UNITED STATES PATENTS

| Number | Name | Date |
|---|---|---|
| 1,394,955 | Von Recklinhausen | Oct. 25, 1921 |
| 1,853,983 | Leach | Apr. 12, 1932 |
| 1,953,533 | Edwards | Apr. 3, 1934 |
| 2,072,713 | Folmsbee | Mar. 2, 1937 |
| 2,234,407 | Hoagland | Mar. 11, 1941 |
| 2,252,830 | Bliss | Aug. 19, 1941 |
| 2,352,775 | Dittmer | July 4, 1944 |
| 2,418,446 | Anderson | Apr. 8, 1947 |